(12) United States Patent
Finkelstein

(10) Patent No.: US 11,546,198 B2
(45) Date of Patent: Jan. 3, 2023

(54) VIRTUAL SPLITS USING POWER DOMAIN NOMA

(71) Applicant: Cox Communications, Inc., Atlanta, GA (US)

(72) Inventor: Jeff Finkelstein, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 17/158,348

(22) Filed: Jan. 26, 2021

(65) Prior Publication Data

US 2022/0239540 A1 Jul. 28, 2022

(51) Int. Cl.
*H04L 27/26* (2006.01)
*H04J 13/00* (2011.01)
*H04L 12/40* (2006.01)
*H04L 12/28* (2006.01)

(52) U.S. Cl.
CPC ...... *H04L 27/2634* (2013.01); *H04J 13/0003* (2013.01); *H04L 12/40195* (2013.01); *H04L 12/2801* (2013.01)

(58) Field of Classification Search
CPC ........... H04L 27/2634; H04L 12/40195; H04L 12/2898; H04L 12/2801; H04J 13/0003; H04B 1/04
See application file for complete search history.

(56) References Cited

U.S. PATENT DOCUMENTS

| | | | | |
|---|---|---|---|---|
| 7,088,733 B1* | 8/2006 | Rowe | ...................... | H04B 3/46 370/468 |
| 7,139,283 B2* | 11/2006 | Quigley | .............. | H04L 49/9094 370/468 |
| 8,310,940 B2* | 11/2012 | Jones | .................. | H04L 12/2801 348/192 |
| 2004/0244044 A1* | 12/2004 | Brommer | ................ | H04L 1/206 725/111 |
| 2007/0223920 A1* | 9/2007 | Moore | ................. | H04B 10/077 398/38 |
| 2010/0034220 A1* | 2/2010 | Kolze | ................ | H04B 1/71072 370/479 |
| 2013/0107921 A1* | 5/2013 | Prodan | ................ | H04L 12/2898 375/222 |
| 2013/0265864 A1* | 10/2013 | Rakib | ....................... | H04L 5/04 370/480 |
| 2017/0180055 A1* | 6/2017 | Yu | ............................ | H04J 14/06 |
| 2019/0140741 A1* | 5/2019 | Cheng | .............. | H04B 10/25753 |

* cited by examiner

*Primary Examiner* — Oussama Roudani
(74) *Attorney, Agent, or Firm* — Eversheds Sutherland (US) LLP

(57) ABSTRACT

The present disclosure relates to multi-MAC controller and single PHY systems and methods. An example method may include transmitting, via a first device in a Data Over Cable Service Interface Specification (DOCSIS) network, a first block of data within a first time slot and at a first power level, the first power level being based on an attenuation of a first network tap device associated with the first device. The example method may also include transmitting, via a second device in the DOCSIS network, a second block of data within the first time slot and at a second power level, the second power level being based on an attenuation of a second network tap device associated with the second device, the first power level being different than the second power level.

20 Claims, 5 Drawing Sheets

300 —

302 — Transmitting, via a first device in a Data Over Cable Service Interface Specification (DOCSIS) network, a first block of data within a first time slot and at a first power level, the first power level being based on an attenuation of a first network tap device associated with the first device 304 — Transmitting, via a second device in the DOCSIS network, a second block of data within the first time slot and at a second power level, the second power level being based on an attenuation of a second network tap device associated with the second device, the first power level being different than the second power level

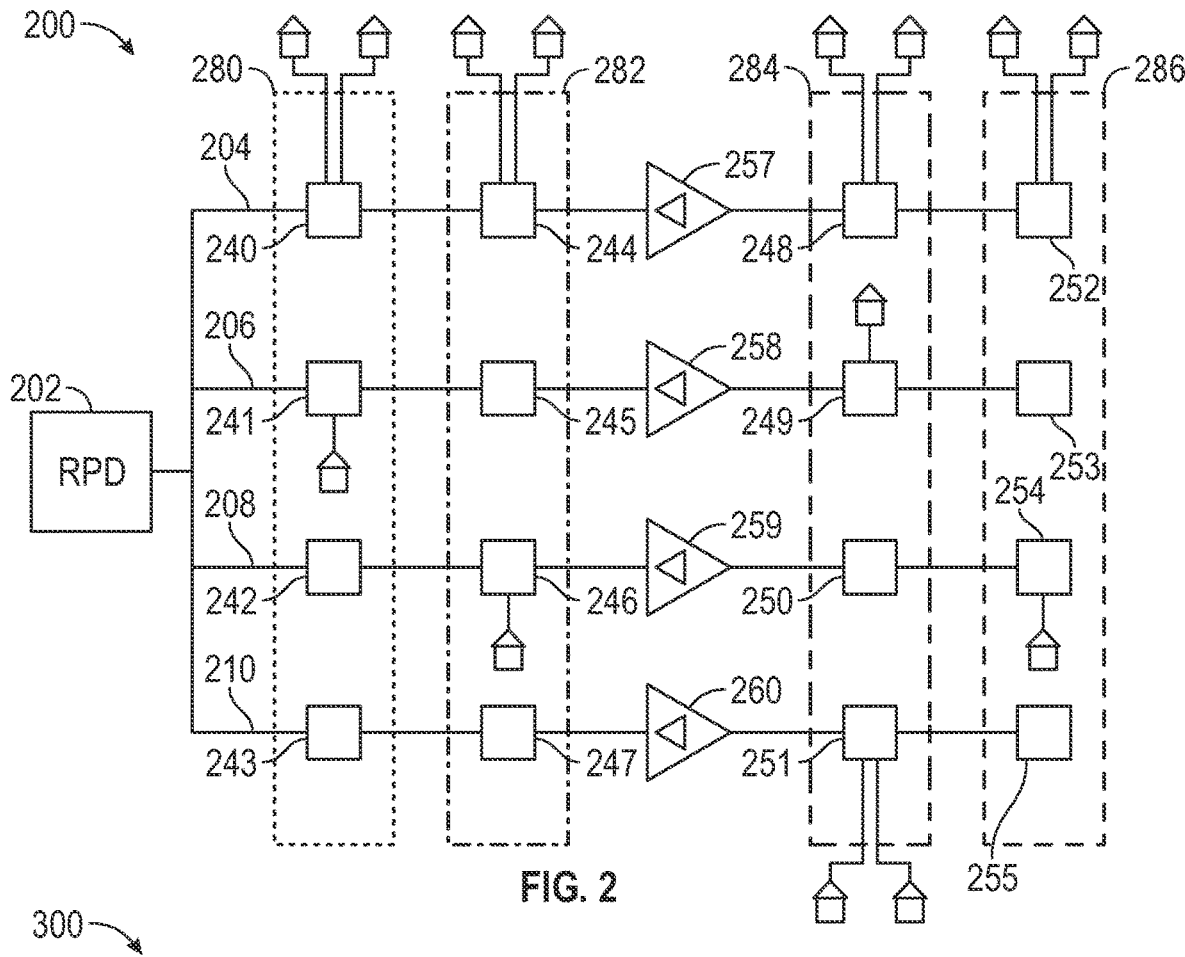

302
Transmitting, via a first device in a Data Over Cable Service Interface Specification (DOCSIS) network, a first block of data within a first time slot and at a first power level, the first power level being based on an attenuation of a first network tap device associated with the first device 304
Transmitting, via a second device in the DOCSIS network, a second block of data within the first time slot and at a second power level, the second power level being based on an attenuation of a second network tap device associated with the second device, the first power level being different than the second power level

FIG. 3

VIRTUAL SPLITS USING POWER DOMAIN NOMA

TECHNICAL FIELD

The disclosure generally relates to the use of power domain Non-Orthogonal Multiple Access (NOMA) for data transmissions in networks. In some embodiments, the disclosure may be implemented in Data Over Cable Service Interface Specification (DOCSIS) networks, but may similarly be applied in other types of networks as well.

BACKGROUND

Before NOMA, networks may have employed Orthogonal Multiple Access (OMA). OMA may be a network modulation scheme in which multiple users may be able to transmit data on a network through the use of orthogonal network resources within either a specific time slot, frequency band, or code in order to avoid multiple access interference. For example, previous OMA schemes employed before NOMA may include, frequency division multiple access (FDMA) of the first generation (1G), time division multiple access (TDMA) of the second generation (2G), code division multiple access (CDMA) of the third generation (3G), and orthogonal frequency division multiple access (OFDMA) of the fourth generation (4G). However, such modulation schemes may only allow one resource element per user at the receiver end of the network.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 2 depicts an example of virtual splits, in accordance with one or more example embodiments of the disclosure.

FIG. 3 depicts a flowchart of an example method, in accordance with one or more example embodiments of the disclosure.

DETAILED DESCRIPTION

Figure 1:
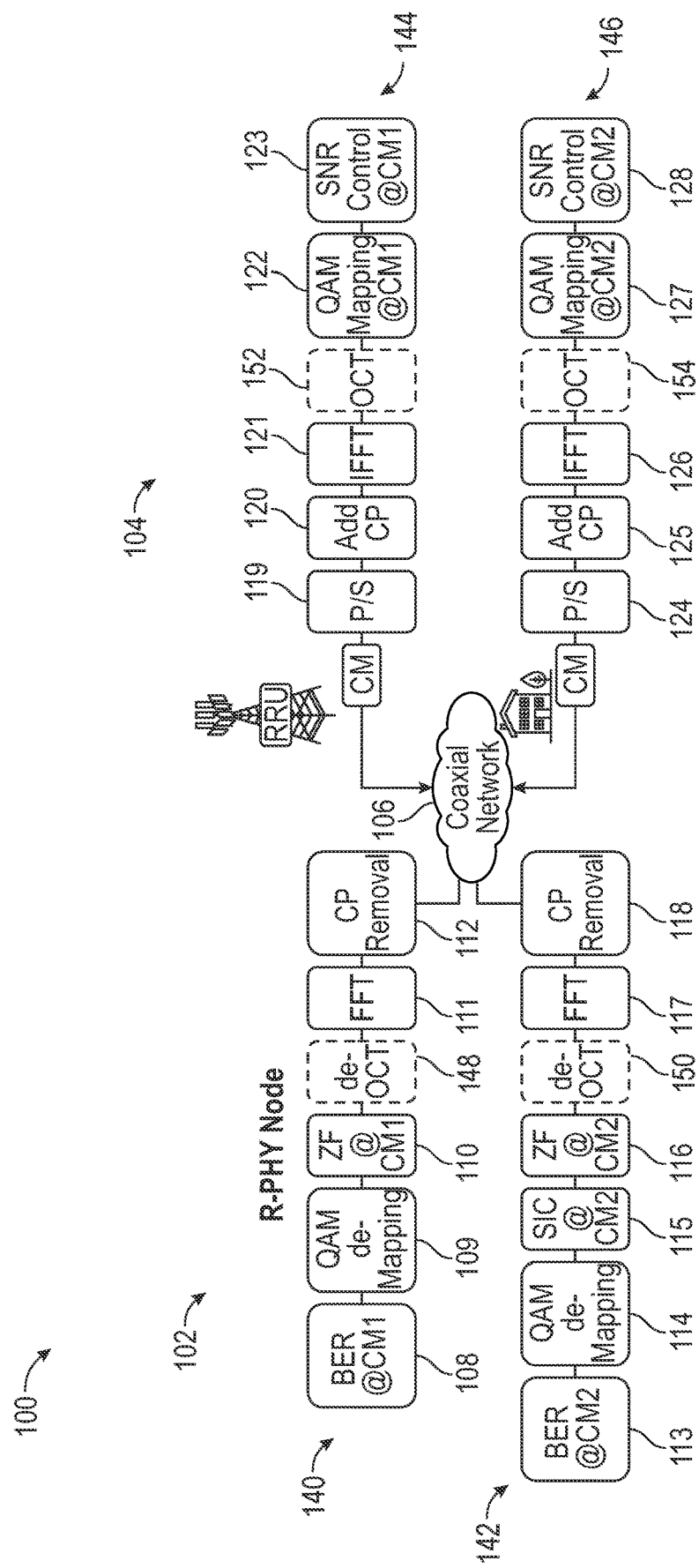
FIG. 1 depicts an example network architecture, in accordance with one or more example embodiments of the disclosure.

The disclosure is directed to, among other things, virtual splits using power domain Non-Orthogonal Multiple Access (NOMA). Virtual splits may refer to groupings of devices in a network that may transmit data using common power levels (which may allow such devices to share network resources to improve network efficiency as described below). For example, as may be described in additional detail below, customer devices (such as modems, for example) connected to a first tap device may transmit data at a first common power level and customer devices connected to a second tap device may transmit data at a second common power level (the common power levels may be a factor of the signal attenuation associated with the different taps). These different common power levels may result in the virtual groupings ("virtual splits") of devices transmitting at different power levels using PD-NOMA. These virtual splits may allow for different devices (for example, customer end devices) in a network to be managed independently of their physical locations (rather they may be managed based on their signal power levels). These virtual splits may also be a unique application of NOMA in DOCSIS networks, as they made be formed based on properties of the tap devices (and other devices) in the network, rather than the transmission power levels being actively controlled by a centralized management system. For example, as mentioned above, the tap devices may be associated with unique signal attenuation values (in some instances, refer to a "power level" of a tap may also refer to this signal attenuation of the tap as well) that may decide the amount of signal that is "dropped-off" to customer devices and subtracted from an output signal of the tap device.

Before NOMA, networks may have employed Orthogonal Multiple Access (OMA). OMA may be a network modulation scheme in which multiple users may be able to transmit data on a network through the use of orthogonal network resources within either a specific time slot, frequency band, or code in order to avoid multiple access interference. For example, previous OMA schemes employed before NOMA may include, frequency division multiple access (FDMA) of the first generation (1G), time division multiple access (TDMA) of the second generation (2G), code division multiple access (CDMA) of the third generation (3G), and orthogonal frequency division multiple access (OFDMA) of the fourth generation (4G). NOMA may differ from these aforementioned OMA modulation schemes by allowing data to be transmitted across a network using non-orthogonal network resources (for example, data blocks may be sent at different power levels instead of in different time slots or frequency slots). This may allow for a single resource element (RE) in the network (or other network resources other than a single RE, such as multiple RE, a resource block time slot, etc.) to be shared by multiple users, which may improve network flexibility and expansibility. A Resource Element (RE) may be a smallest defined unit include one OFDM sub-carrier during one OFDM symbol interval. Multiple resource elements may be combined into an overall Resource Block, and transmissions may be scheduled using such Resource Blocks. In general, NOMA schemes can be classified into two types: power-domain multiplexing and code-domain multiplexing. In power-domain multiplexing, different users may be allocated different power coefficients according to their channel conditions in order to achieve a high system performance. In some cases, the amount of the power domain that are used by individual users may be equal, however, in other cases, different users may utilize different amounts of the power domain in a given resource element (RE). In particular, multiple users' signals may be combined at the transmitter side. At the receiver side, successive interference cancellation (SIC) may be used to decode the signals until the desired user's signal remains. In code-domain multiplexing, different users may be allocated different codes and multiplexed over the same time-frequency resources. The systems and methods described herein may primarily pertain to PD-NOMA, but may also apply to other variants of NOMA in some cases as well.

With respect to a DOCSIS network in particular, groups of customer devices may be connected to different tap devices on a network. For example, a first group of five customer devices may be connected to a first network tap, a second group of six customer devices may be connected to a second network tap, and so on (these are just examples of numbers of devices that may be connected to a given tap, and any other number of devices may also be connected to a tap as well). These tap devices may be inserted into locations on a network and may be used to split or copy packets from the network for creating additional customer service access points. A tap may also be associated with a split-ratio, which may be indicative of a percentage of signal received by the tap that is passed through the tap and downstream the network versus a percentage of signal that is split off for creating additional network terminations. The customer devices connected to the different taps may operate at different power levels. That is, individual network taps may attenuate a signal received from an upstream portion of the network down to a particular power level based on the properties of the individual tap. This attenuated signal may then be output by the tap downstream the network to additional tap devices and their associated customer devices. The closer a network tap is to an upstream signal origination point on the network, the higher the signal power level may be provided to the customer devices associated with that tap. As one non-limiting example, a network may include three tap devices each serving five customer devices. A signal may be sent downstream to a first tap device of the three tap devices at a signal power level of 50 dB. If the attenuation associated with the first tap device is 25 dB, then 25 dB of the input 50 dB signal may be provided to the customer devices. Consequentially, the signal output of the first tap may be the input signal power level of 50 dB subtracted by the attenuation of the first tap of 25 dB (so the power level of the signal output from the first tap to the second tap in the network may be 25 dB). Continuing the same example, the second tap device may have an associated attenuation of 10 dB, for example. The second tap device may receive the output signal at 25 dB from the first tap device and provide 10 dB of this signal to the customer devices associated with the second tap device. The second tap may then provide an attenuated output signal of 15 dB (25 dB input subtracted by the 10 dB power level) to the third tap.

As may be illustrated through this above example, the configuration of the network in this manner including fixed attenuation levels of tap devices may result in natural power level separations of various customer devices in the network associated with various different taps. For example, the customer devices associated with the first tap may operate with a power level of 25 dB, the customer devices associated with the second tap may operate with a power level of 10 dB, and the customer devices associated with the third tap may operate with the power level consistent with the power level of the signal provided to the customer devices associated with the third tap. This allows the signals transmissions from the customer devices associated with the different taps to be stacked along the power domain since they are operating at different power levels, which may result in a natural PD-NOMA split of signal transmissions. This separation of transmissions signal power levels of various customer devices based on the attenuation level of the tap to which they are connected may allow for "virtual groupings" of customer devices to be formed. For example, the customer devices associated with the first tap in the above example may be grouped together into one virtual group that may transmit at a power level of 25 dB. This concept may be further illustrated in FIG. 2 described below (for example, through the virtual groupings 280, 282, 284, and 286). Additionally, in some cases, the virtual groupings may be formed based on power levels other than the power levels of the signals being provided to the customer devices, such as the power level of an input signal to a given tap, a power level of an output signal from a given tap, etc.

In some embodiments, these "virtual groupings" of customer devices may also include customer devices connected to different taps. For example, in some cases, different taps in the network may be associated with similar attenuation values. This concept may be further illustrated in FIG. 2 described below. For example, the network may include a first tap operating at a 27 dB attenuation and a second tap operating at a 17 dB attenuation. Although the signal output from the second tap may be reduced to a certain power level based on the attenuation of the first and second taps, the network may also include one or more amplifiers that may raise the power level back up to a higher power level. Thus, following the amplifier may exist two additional taps, where, for example, one of these two taps may operate at the same attenuation as one of the first or second taps. As a more specific example, the third tap may also operate at an attenuation of 27 dB. With this being the case, customer devices associated with the first tap and the third tap may be grouped together because they may be operating at the same power level (this may also depend on whether the amplifier raises the signal power level to a power level at which the signal may have been before entering the first tap). This configuration specific to DOCSIS networks may be unique because whereas typical networks implementing NOMA may be managed by a central authority that manages what the power level needs to be for various signal transmissions, the power levels used by various customer devices in the DOCSIS network described herein may instead depend on the attenuation levels of the tap devices already included in the network (without having to rely on a centralized authority providing instructions).

In some instances, the power levels associated with the aforementioned virtual groupings, or the customer devices included within the virtual groupings, may be adjusted. Such adjustments may occur for a number of reasons. A first example of a reason for such adjustments may include attenuation changes in the network. Networks, such as DOCSIS networks described herein, may inherently experience attenuation changes based on factors such as above ground cables swinging in the wind and temperature fluctuations, among various other factors. Such attenuation changes may take place even as often as every 100 ms in some cases. A second example of a reason for such adjustments may include changes to the devices included within the network. Although in some cases the devices included within the network and the attenuation level associated with those devices may remain relatively fixed, in some cases these devices and/or attenuation levels may change by a more significant amount than the changes resulting from factors inherent to the network as described in the first example. For example, tap devices may be replaced with different tap devices associated with different attenuation values.

In some embodiments, and as mentioned above, interference cancellation (for example, successive interference cancellation (SIC) or parallel interference cancellation (PIC), as well as any other types of interference cancellation) may be used at the receiver side to separate out combined signals including transmissions from multiple transmitter devices at multiple different power levels into the one or more transmissions associated with the transmitter that the receiver desired to receive information from. In some instances, the interference cancellation described herein may more specifically relate to minimum mean square error (MMSE) cancellation. SIC may involve decoding and removing signals associated with individual devices one at a time before decoding and obtaining signals for additional devices. PIC may involve decoding and obtaining signals for different devices simultaneously. As one general example of interference cancellation, a first customer device may transmit at a power level of 25 dB and a second customer device may transmit at a power level of 10 dB. Using PD-NOMA, these two transmissions may be performed at the same time by stacking them at the different power levels in the signal transmission. At the receiver side, if the receiver wants to read the information associated with the first customer device, the interference cancellation may be used to separate out the 25 dB signal from the 10 dB signal in order to obtain the transmission from the first customer device.

Turning to the figures, FIG. 1 depicts an example network 100 architecture. The example network 100 architecture may illustrate some of the components included in a network that uses PD-NOMA as described herein. A more comprehensive illustration of components that may be included in such a network may be shown in FIG. 7, for example (however, other network configurations are possible as well). The network 100 may include one or more upstream components 102 and one or more downstream components 104. The one or more upstream components 102, for example, may include remote PHY device (RPD) (for example, remote PHY device 140 and remote PHY device 142, as well as any other number of remote PHY devices and/or any other type of device) in the example shown in FIG. 1. The one or more downstream components 104 may include customer end devices, such as modems (for example, customer modem 144, customer modem 146, or any other type of customer device). In some instances, the one or more upstream components 102 and one or more downstream components 104 may be components included in the network 700 described below with respect to FIG. 7 (for example, the one or more upstream components 102 may be the remote PHY device 708 and the one or more downstream components 104 may include the customer premises equipment (CPE)). However, the one or more upstream components 102 and one or more downstream components 104 may similarly include any two or more network components that may communicate using PD-NOMA as described herein. The one or more upstream components 102 and one or more downstream components 104 may be connected by a coaxial network 106, however, the one or more upstream components 102 and one or more downstream components 104 may also be connected by any other type of physical or virtual connection as well.

In some embodiments, the one or more upstream components 102 may include at least one or more bit error rate (BER) modules (for example, BER module 108 and/or BER module 113), one or more quadrature amplitude modulation (QAM) de-mapping modules (for example, QAM de-mapping module 109 and/or QAM de-mapping module 114), one or more zero forcing (ZF) modules (for example, ZF module 110 and/or ZF module 116), one or more Fast Fourier Transform (FFT) modules (for example, FFT module 111 and/or FFT module 117), and one or more cyclic prefix (CP) removal modules 112 (for example, CP removal module 112 and/or CP removal module 118). The one or more upstream components 102 may also include one or more self-interference cancellation (SIC) modules 115. In some embodiments, the one or more upstream components 102 may also include one or more de-orthogonal circulate transform (de-OCT) modules 105 (for example, de-OCT module 148 and/or de-OCT module 150).

In some embodiments, the one or more BER modules may be used to calculate a Bit Error Rate (BER) for data being received. BER may be a measure of signal integrity based on the quantity or percentage of transmitted bits that are received incorrectly. The more bits that are received incorrectly, the greater the impact on signal quality (so a higher BER may be indicative of a poorly performing network).

In some embodiments, the one or more QAM de-mapping modules may be used to map a received QAM constellation signal into data points. QAM may be one example of a modulation scheme that may be used to transmit data between devices. In a digital modulation system, information may be transmitted as a series of samples, with each sample being transmitted at a different time slot. Individual samples may include a carrier waveform that has a constant amplitude and phase. Each sample may encode one or more "symbols," which may represent one or more binary bits of data. Each symbol may be encoded as a different combination of amplitude and phase of the carrier waveform, so each symbol is represented by a point called a constellation point. Multiple of such symbols may be transmitted simultaneously using this modulation scheme, with a combination of constellation points forming what is called a "constellation diagram." On the constellation diagram, a distance a constellation point is away from an origin may provide an indication of the amplitude of that particular point. Similarly, a distance between two constellation points on the constellation diagram may be indicative of phase shifts between the two points. The constellation diagram may show all of the possible symbols that can be transmitted by the system as a collection of points. In a frequency or phase modulated signal, the signal amplitude may be constant, so the constellation points lie on a circle around an origin of the constellation diagram. However, amplitude modulation (or other types of modulation may also be used), which may lead to different shapes of constellation diagrams. The shape and size of the constellation diagram may depend on the type of QAM being used (for example, 8QAM, 16QAM, 64QAM, 128QAM, 256QAM, or any other type of QAM). Thus, the one or more QAM de-mapping modules may be used as part of the one or more upstream components 102 (which may represent receiving devices receiving data from transmitting devices) because the upstream components 102 may receive data being transmitted using QAM. The one or more QAM de-mapping modules may receive the transmitted symbols and extract the data included in the symbols, hence "de-mapping" the information included in the constellation points in the constellation map. Although the de-mapping module is specifically described as being used for a QAM scheme herein, any other modulation scheme may similarly be employed to transmit data between devices.

In some embodiments, the one or more ZF modules may be used to perform zero force precoding, which may be a form of spatial signal processing that may remove multi-user interference. If channel state information is perfectly known at a transmitter, then the zero-forcing precoding may be provided by a Moore-Penrose pseudo-inverse of a channel matrix. The one or more FFT modules may be used to convert a received signal from the time domain back into the frequency domain (for example, by performing a FFT on the received signal). When data is transmitted between devices, the data may be transmitted in the time domain. Thus, as described below, a transmitted signal may be converted from the frequency domain to the time domain by an IFFT module before transmission, and upon receipt, the signal may be converted back from the time domain to the frequency domain. The one or more CP removal modules may be used to remove a cyclic prefix from the signal. A cyclic prefix may be created at the transmitting side to prevent intersymbol interference (ISI) when a signal is transmitted in a dispersive channel. In some cases, the cyclic prefix (CP) may be an identical copy of the last portion of the symbol appended before the symbol. This CP may preserve the orthogonality of the subcarriers and prevent ISI between successive symbols.

In some embodiments, the one or more interference cancellation (IC) modules may be used to perform self-interference cancellation on a received signal. Interference cancellation (for example, successive interference cancellation (SIC) or parallel interference cancellation (PIC), as well as any other types of interference cancellation) may be used at the receiver side to separate out combined signals including transmissions from multiple transmitter devices at multiple different power levels into the one or more transmissions associated with the transmitter that the receiver desired to receive information from. In some instances, the interference cancellation described herein may more specifically relate to minimum mean square error (MMSE) cancellation. SIC may involve decoding and removing signals associated with individual devices one at a time before decoding and obtaining signals for additional devices. PIC may involve decoding and obtaining signals for different devices simultaneously. As one general example of interference cancellation, a first customer device may transmit at a power level of 25 dB and a second customer device may transmit at a power level of 10 dB. Using PD-NOMA, these two transmissions may be performed at the same time by stacking them at the different power levels in the signal transmission. At the receiver side, if the receiver wants to read the information associated with the first customer device, the interference cancellation may be used to separate out the 25 dB signal from the 10 dB signal in order to obtain the transmission from the first customer device.

In some embodiments, the one or more downstream components 104 may include at least one or more parallel to serial conversion modules (for example, P/S 119 and/or P/S 124), one or more cyclic prefix adding modules (for example, Add CP 120 and/or Add CP 125), one or more Inverse Fast Fourier Transform (IFFT) modules (for example, IFFT 121 and/or IFFT 126), one or more QAM mapping modules (for example, QAM mapping 122 and/or QAM mapping 127), and/or one or more signal to noise ratio (SNR) control modules (for example, SNR control 123 and/or SNR control 128). In some embodiments, the one or more downstream components 104 may also include one or more orthogonal circulant transform (OCT) modules (for example, OCT module 152 and/or OCT module 154).

In some embodiments, the one or more parallel to serial conversion modules may be used to perform parallel to serial conversion. The one or more parallel to serial conversion modules may be used because not all devices in the network may function entirely as parallel-only or serial-only components. The one or more cyclic prefix adding modules may add a cyclic prefix to a signal as mentioned above. The one or more IFFT modules may be used to perform an inverse FFT on the signal, which may involve converting the signal from the frequency domain to the time domain before a signal is transmitted. The one or more QAM mapping modules may involve mapping data into QAM constellations. That is, while the one or more QAM de-mapping modules associated with the receiving devices may de-map a QAM constellation map, the one or more QAM mapping modules associated with the transmitting devices may map data to be transmitted into the QAM constellation map that is transmitted to the receiving devices. The one or more SNR control modules may be used to control the ratio of the power of the signal versus the power of the noise in transmissions being made over the network. For example, SNR may be at least partially controlled by a transmit level which may be set by a CMTS or RPD.

It should be noted that any of the modules described with respect to FIG. 1 may be implemented in any of the hardware described below with respect to FIGS. 4-7. For example, any of the modules maybe be implemented in hardware including processors, memory, and any other elements described in FIGS. 4-7.

FIG. 2 depicts an example of virtual splits for an example network 200, in accordance with one or more example embodiments of the disclosure. The example network 200 may be the same as any of the networks described herein (such as, for example, network 100, network 700, or any other network). The network 200 may include one or more upstream devices 202 (which may be depicted as a remote PHY device in the figure, but may also be any other type of device). The one or more upstream devices 200 may include one or more output legs (for example, leg 204, leg 206, leg 208, and/or leg 210, as well as any other legs) that may be connected to one or more customer devices through one or more tap devices (for example, tap devices 240-255). The network may also include one or more amplifiers (for example, amplifiers 257-260). Individuals such taps in the network 200 may operate at different power levels. That is, individual taps may attenuate a signal from upstream the network 200 down a certain amount based on the power level of the individual tap. This attenuated signal may then be provided downstream the network to other tap devices and customer devices. The closer a tap is to an upstream signal origination point on the network (or an amplifier in the network), the higher the signal power level may be provided to the customer devices associated with that tap. Returning to the example depicted in the figure, a signal may be sent downstream to a first tap device 240 on the first leg 204, a second tap device 244 on the second leg 206, a third tap device 248 on the third leg 208, and a fourth tap device 252 on the fourth leg 210. The signal may be sent to all of these taps devices at a signal power level of 50 dB. If the attenuation of all four of these tap devices is 25 dB, then a 25 dB signal may be provided to the customer devices associated with these four tap devices, and the signal output of these four tap devices tap may be the input signal power level of 50 dB subtracted by the attenuation of the individual tap devices of 25 dB (so the power level of the signal output from the first four taps on each of the four legs to the next four taps on each of the legs may be 25 dB). Continuing the same example, the next four tap devices (for example, a fifth tap 241 on the first leg 204, a sixth tap 245 on the second leg 206, a seventh tap 249 on the third leg 208, and an eight tap 253 on the fourth leg 210) may have an associated attenuation of 10 dB, for example. The second set of four tap devices may receive the output signal at 25 dB from the first set of four tap devices and provide these 10 dB signals to the customer devices associated with the second of tap devices. These tap devices may then output an output signal at 15 dB. This process may continue for any number of tap devices on any number of legs on the example network 200.

As may be illustrated through this above example, the configuration of the network 200 in this manner including fixed power levels of tap devices may result in natural power level separations of various customer devices in the network associated with various different taps. For example, the customer devices associated with the first set of tap devices may operate with a power level of 25 dB and the customer devices associated with the second set of tap devices may operate with a power level of 15 dB. This allows the signals transmissions from the customer devices associated with the different taps to be stacked along the power domain since they are operating at different power levels, which may result in a natural PD-NOMA split of signal transmissions. This separation of transmissions signal power levels of various customer devices based on the attenuation level of the tap to which they are connected may allow for "virtual groupings" of customer devices to be formed. For example, the customer devices associated with the first set of tap devices in the above example may be grouped together into one virtual group 262 that may transmit at a power level of 25 dB.

In some embodiments, these "virtual groupings" of customer devices may also include customer devices connected to different taps (for example, virtual group 280, virtual group 282, virtual group 284, and/or virtual group 286). For example, in some cases, different taps in the network may be associated with similar power levels. This may be the case, for example, if amplifiers are included in the network 200, such as the amplifiers depicted in the figure. As described above, the amplifiers may be used to amplify the power level of the signal. Continuing the above example, if the amplifiers were to amplify the power levels of the signals on each of the legs back up to 50 dB, then the customer devices associated with the third set of taps may also be operating at a power level of 25 dB like the customer devices associated with the first set of tap devices. With this being the case, customer devices associated with the first set of tap devices and the third set of tap devices may be grouped together because they may be operating at the same power level. Finally, it should be noted that although the example network 200 may be described above as including taps on each leg with equivalent attenuation levels (as well as amplifiers amplifying signals on each leg by an equivalent amount, this is merely for illustrative purposes. Any of the devices included on any of the legs may be associated with their own unique properties (for example, any of the taps on any of the legs may be associated with different attenuation levels).

FIG. 3 is an example method 300 in accordance with one or more example embodiments of the disclosure. At block 302 of the method 300 in FIG. 3, the method may include transmitting, via a first device in a Data Over Cable Service Interface Specification (DOCSIS) network, a first block of data within a first time slot and at a first power level, the first power level being based on an attenuation of a first network tap device associated with the first device. Block 304 of the method 300 may include transmitting, via a second device in the DOCSIS network, a second block of data within the first time slot and at a second power level, the second power level being based on an attenuation of a second network tap device associated with the second device, the first power level being different than the second power level.

The operations described and depicted in the illustrative process flows of FIG. 3 may be carried out or performed in any suitable order as desired in various example embodiments of the disclosure. The operations described and depicted in the illustrative process flows of FIG. 3 may be carried out or performed by any devices described herein, such as the management computing entity 500 described with respect to FIG. 5, as well as any other device described herein). Additionally, in certain example embodiments, at least a portion of the operations may be carried out in parallel. Furthermore, in certain example embodiments, less, more, or different operations than those depicted in FIG. 3 may be performed.

In some embodiments, the method 300 may also include receiving, by a third device in the DOCSIS network, the first block of data and the second block of data. The method 300 may also include separating, by the third device, the first block of data from the second block of data using at least one of: successive interference cancellation (SIC) or parallel interference cancellation (PIC). In some embodiments, transmitting the first block of data within a first time slot further comprises transmitting the first block of data at a first frequency, and wherein transmitting the second block of data further comprises transmitting the second block of data at the first frequency. In some embodiments, the first device further comprises one or more Bit Error Rate (BER) modules, one or more QAM de-mapping modules, one or more zero forcing modules, one or more Fast Fourier Transform (FFT) modules and one or more cyclic prefix removal modules. In some embodiments, the first device further comprises one or more parallel/serial conversion modules, one or more QAM mapping modules, one or more signal to noise ratio control modules, one or more Inverse Fast Fourier Transform (IFFT) modules and one or more cyclic prefix adding modules. In some embodiments, the first block of data and second block of data are transmitted using Power Domain Non-Orthogonal Multiple Access (PD-NOMA). In some embodiments, the method 300 may further comprise transmitting, by a fourth device in the DOCSIS network, a third block of data at the first power level and in a second time slot.

One or more operations of the process flows of FIG. 3 may have been described above as being performed by a user device, or more specifically, by one or more program modules, applications, or the like executing on a device. It should be appreciated, however, that any of the operations of process flows of FIG. 3 may be performed, at least in part, in a distributed manner by one or more other devices, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the process flows of FIG. 3 may be described in the context of the illustrative vehicle transaction platform, it should be appreciated that such operations may be implemented in connection with numerous other device configurations.

Figure 4:
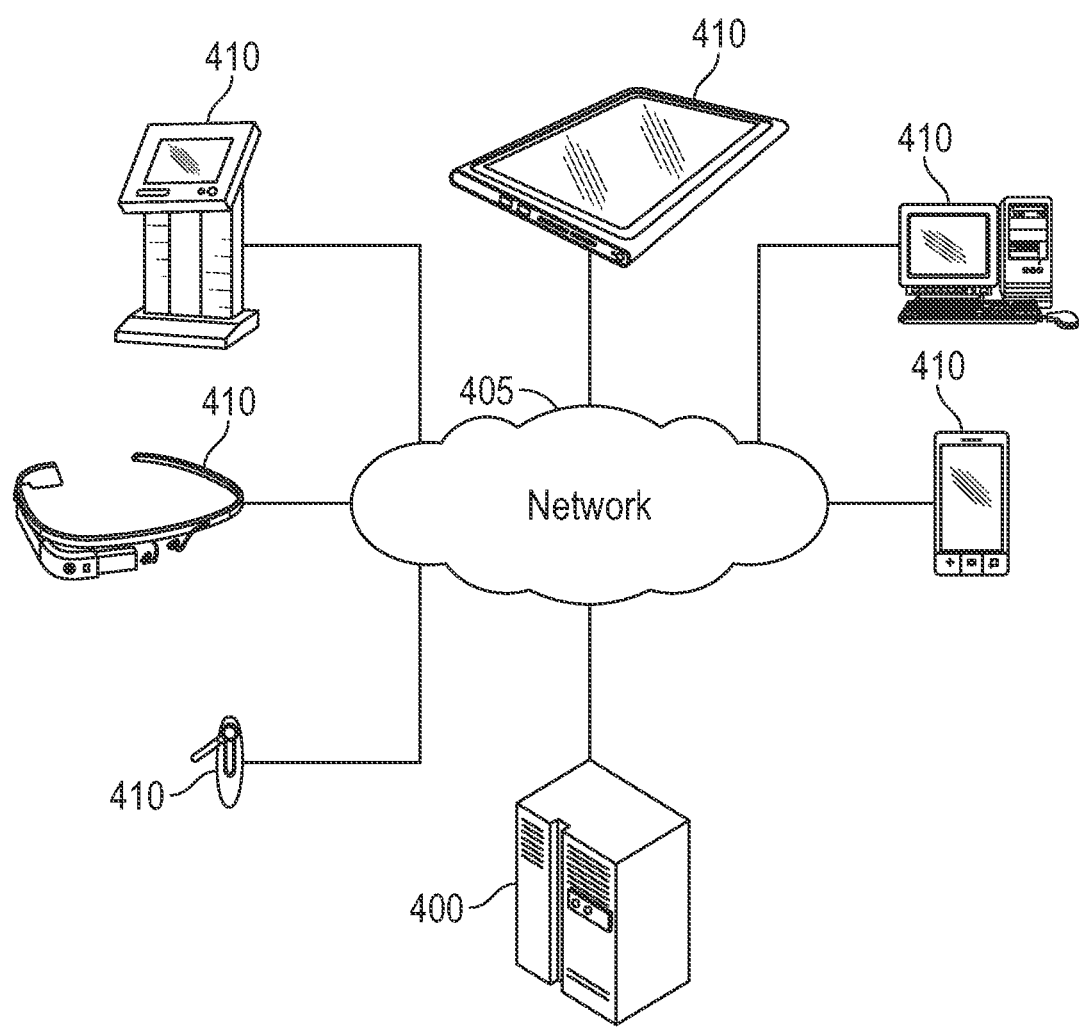
FIG. 4 depicts an example system architecture, in accordance with one or more example embodiments of the disclosure.

FIG. 4 provides an illustration of an example embodiment of the present disclosure. As shown in FIG. 4, this particular embodiment may include one or more management computing entities 400 (which may be the same as management computing entity 500 described in more detail with respect to FIG. 5), one or more networks 405, and one or more user devices 410. Each of these components, entities, devices, systems, and similar words used herein interchangeably may be in direct or indirect communication with, for example, one another over the same or different wired or wireless networks. Additionally, while FIG. 4 illustrates the various system entities as separate, standalone entities, the various embodiments are not limited to this particular architecture.

In various aspects, the management computing entities 400 may include various devices on a cable network, including, but not limited to, switches, remote MAC devices, cable modem termination system (CMTS) devices, remote PHY devices, amplifiers, fiber nodes, and the like, to be variously described below. In another aspect, such devices may include circuitry (for example, processors and memory) and associated software instructions (for example, computer code) to perform various functions associated with such devices (for example, transmit packets, receive packets, process packets, sort packets, provide status updates, download and install software updates, etc.).

In another aspect, the networks 405 may include, but not be limited to, cable networks including hybrid fiber-coaxial cable networks. More broadly, the networks 405 may include at least portions of wireless networks or wired networks. In another aspect, a cable network may use various sub-networks (for example, WiFi networks, cellular networks) to perform aspects of the functionality described herein, for example, in connection with the disclosed devices (for example, switches, remote MAC devices, CMTS devices, remote PHY devices, amplifiers, fiber nodes, and the like).

In another aspect, the user devices 410 may include, but not be limited to, devices associated with a customer premise equipment (for example, one or more devices at a customer home). Non-limiting examples may include, but not be limited to, one or more computers, computing entities, desktop computers, mobile phones, tablets, phablets, notebooks, laptops, distributed systems, gaming consoles (for example Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein.

Figure 5:
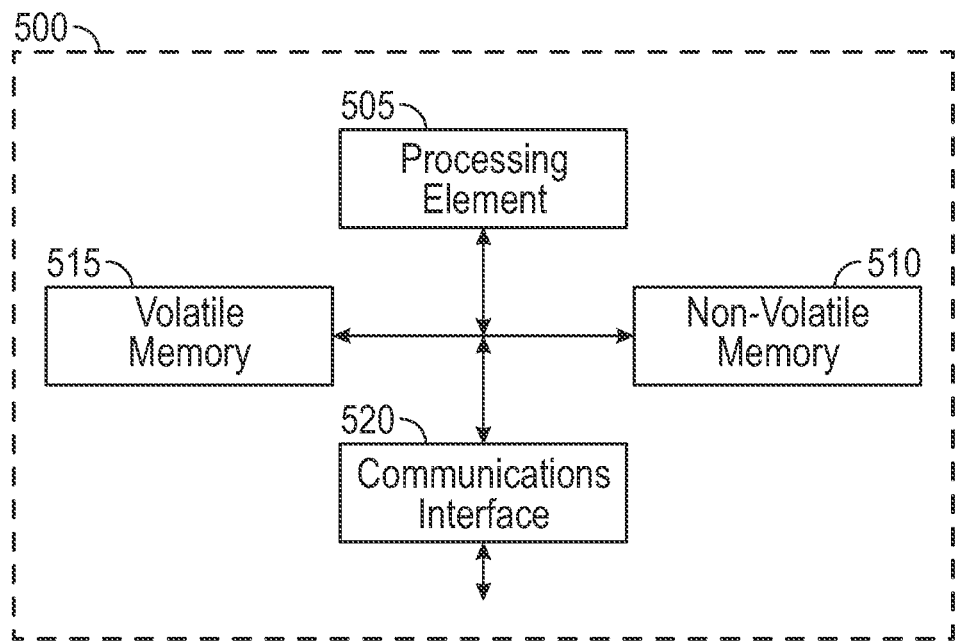
FIG. 5 depicts an example computing entity, in accordance with one or more example embodiments of the disclosure.

FIG. 5 provides a schematic of a management computing entity 500 according to one embodiment of the present disclosure. As noted above, a management computing entity 500 may include various devices on a cable network, including, but not limited to, switches, remote MAC devices, CMTS devices, remote PHY devices, amplifiers, fiber nodes, and the like, as described above. Some or all of the elements of the management computing entity 500 may also be included in any of the modules described with respect to FIG. 1.

In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (for example Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In some embodiments, these functions, operations, and/or processes can be performed on data, content, information, and/or similar terms used herein interchangeably.

As indicated, in some embodiments, the management computing entity 500 may also include one or more communications interfaces 520 for communicating with various computing entities, such as by communicating data, content, information, and/or similar terms used herein interchangeably that can be transmitted, received, operated on, processed, displayed, stored, and/or the like. For instance, the management computing entity 500 may communicate with user devices 410 and/or a variety of other computing entities.

As shown in FIG. 5, in some embodiments, the management computing entity 500 may include or be in communication with one or more processing elements 505 (also referred to as processors, processing circuitry, and/or similar terms used herein interchangeably) that communicate with other elements within the management computing entity 500 via a bus, for example. As will be understood, the processing element 505 may be embodied in a number of different ways. For example, the processing element 505 may be embodied as one or more complex programmable logic devices (CPLDs), microprocessors, multi-core processors, coprocessing entities, application-specific instruction-set processors (ASIPs), microcontrollers, and/or controllers. Further, the processing element 505 may be embodied as one or more other processing devices or circuitry. The term circuitry may refer to an entirely hardware embodiment or a combination of hardware and computer program products. Thus, the processing element 505 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 505 may be configured for a particular use or configured to execute instructions stored in volatile or non-volatile media or otherwise accessible to the processing element 505. As such, whether configured by hardware or computer program products, or by a combination thereof, the processing element 505 may be capable of performing steps or operations according to embodiments of the present disclosure when configured accordingly.

In some embodiments, the management computing entity 500 may further include or be in communication with non-volatile media (also referred to as non-volatile storage, memory, memory storage, memory circuitry and/or similar terms used herein interchangeably). In some embodiments, the non-volatile storage or memory may include one or more non-volatile storage or memory media 510, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In some embodiments, the management computing entity 500 may further include or be in communication with volatile media (also referred to as volatile storage, memory, memory storage, memory circuitry and/or similar terms used herein interchangeably). In some embodiments, the volatile storage or memory may also include one or more volatile storage or memory media 515, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 505. Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity 500 with the assistance of the processing element 505 and operating system.

As indicated, in some embodiments, the management computing entity 500 may also include one or more communications interfaces 520 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 500 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the management computing entity 500 may include or be in communication with one or more input elements, such as a keyboard input, a mouse input, a touch screen/display input, motion input, movement input, audio input, pointing device input, joystick input, keypad input, and/or the like. The management computing entity 500 may also include or be in communication with one or more output elements (not shown), such as audio output, video output, screen/display output, motion output, movement output, and/or the like.

As will be appreciated, one or more of the management computing entity's 500 components may be located remotely from other management computing entity 500 components, such as in a distributed system. Furthermore, one or more of the components may be combined and additional components performing functions described herein may be included in the management computing entity 500. Thus, the management computing entity 500 can be adapted to accommodate a variety of needs and circumstances. As will be recognized, these architectures and descriptions are provided for example purposes only and are not limiting to the various embodiments.

Figure 6:
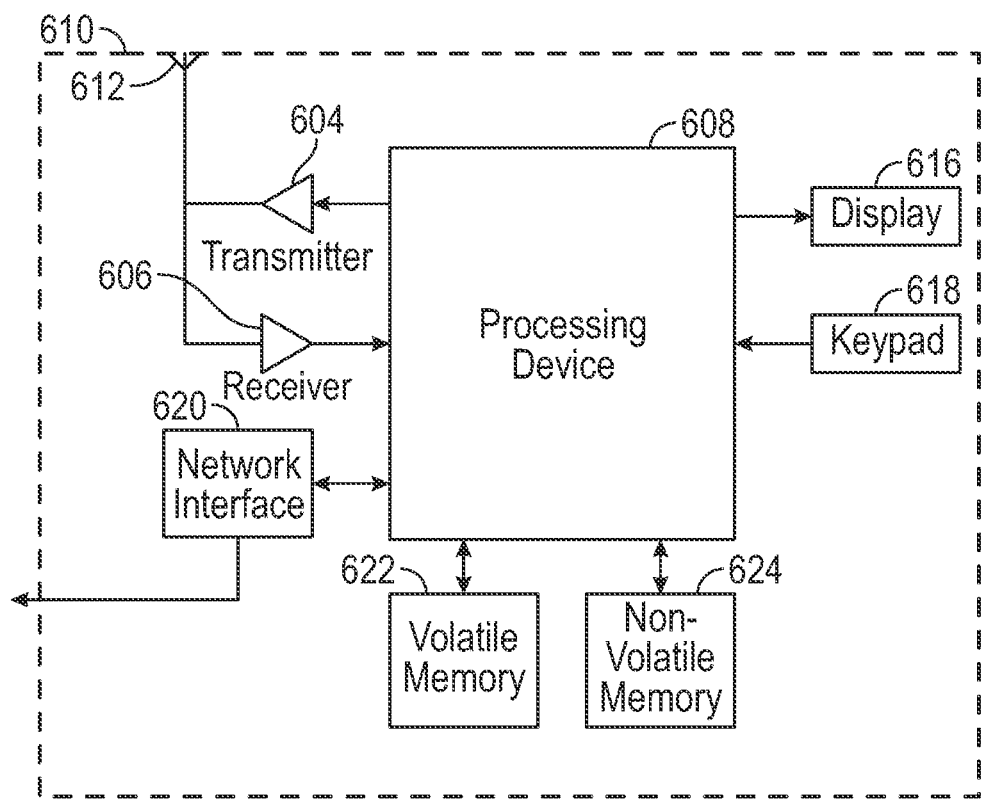
FIG. 6 depicts an example user device, in accordance with one or more example embodiments of the disclosure.

FIG. 6 depicts an example user device 610, in accordance with one or more example embodiments of the disclosure. A user may be an individual, a family, a company, an organization, an entity, a department within an organization, a representative of an organization and/or person, and/or the like. In one example, users may be employees, residents, customers, and/or the like. For instance, a user may operate a user device 610 that includes one or more components that are functionally similar to those of the management computing entity 500 described with respect to FIG. 5 above. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (for example Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User devices 610 can be operated by various parties. As shown in FIG. 6, the user device 610 can include an antenna 612, a transmitter 604 (for example radio), a receiver 606 (for example radio), and a processing element 608 (for example CPLDs, microprocessors, multi-core processors, coprocessing entities, ASIPs, microcontrollers, and/or controllers) that provides signals to and receives signals from the transmitter 604 and receiver 606, respectively.

The signals provided to and received from the transmitter 604 and the receiver 606, respectively, may include signaling information in accordance with air interface standards of applicable wireless systems. In this regard, the user device 610 may be capable of operating with one or more air interface standards, communication protocols, modulation types, and access types. More particularly, the user device 610 may operate in accordance with any of a number of wireless communication standards and protocols, such as those described above with regard to the management computing entity 500. In a particular embodiment, the user device 610 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user device 610 may operate in accordance with multiple wired communication standards and protocols, such as those described above with regard to the management computing entity 500 via a network interface 620.

Via these communication standards and protocols, the user device 610 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user device 610 can also download changes, add-ons, and updates, for instance, to its firmware, software (for example including executable instructions, applications, program modules), and operating system.

According to one embodiment, the user device 610 may include location determining aspects, devices, modules, functionalities, and/or similar words used herein interchangeably. For example, the user device 610 may include outdoor positioning aspects, such as a location module adapted to acquire, for example, latitude, longitude, altitude, geocode, course, direction, heading, speed, universal time (UTC), date, and/or various other information/data. In some embodiments, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user device's 610 position in connection with a variety of other systems, including cellular towers, Wi-Fi access points, and/or the like. Similarly, the user device 610 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (for example smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user device 610 may also comprise a user interface (that can include a display 616 coupled to a processing element 608) and/or a user input interface (coupled to a processing element 608). For example, the user interface may be a user application, browser, user interface, and/or similar words used herein interchangeably executing on and/or accessible via the user device 610 to interact with and/or cause display of information from the management computing entity 500, as described herein. The user input interface can comprise any of a number of devices or interfaces allowing the user device 610 to receive data, such as a keypad 618 (hard or soft), a touch display, voice/speech or motion interfaces, or other input devices. In embodiments including a keypad 618, the keypad 618 can include (or cause display of) the conventional numeric (0-9) and related keys (#, *), and other keys used for operating the user device 610 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user device 610 can also include volatile storage or memory 622 and/or non-volatile storage or memory 624, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user device 610. As indicated, this may include a user application that is resident on the entity or accessible through a browser or other user interface for communicating with the management computing entity 500 and/or various other computing entities.

In some embodiment, the user device 610 may include one or more components or functionality that are the same or similar to those of the management computing entity 500, as described in greater detail above. As will be recognized, these architectures and descriptions are provided for example purposes only and are not limiting to the various embodiments.

Figure 7:
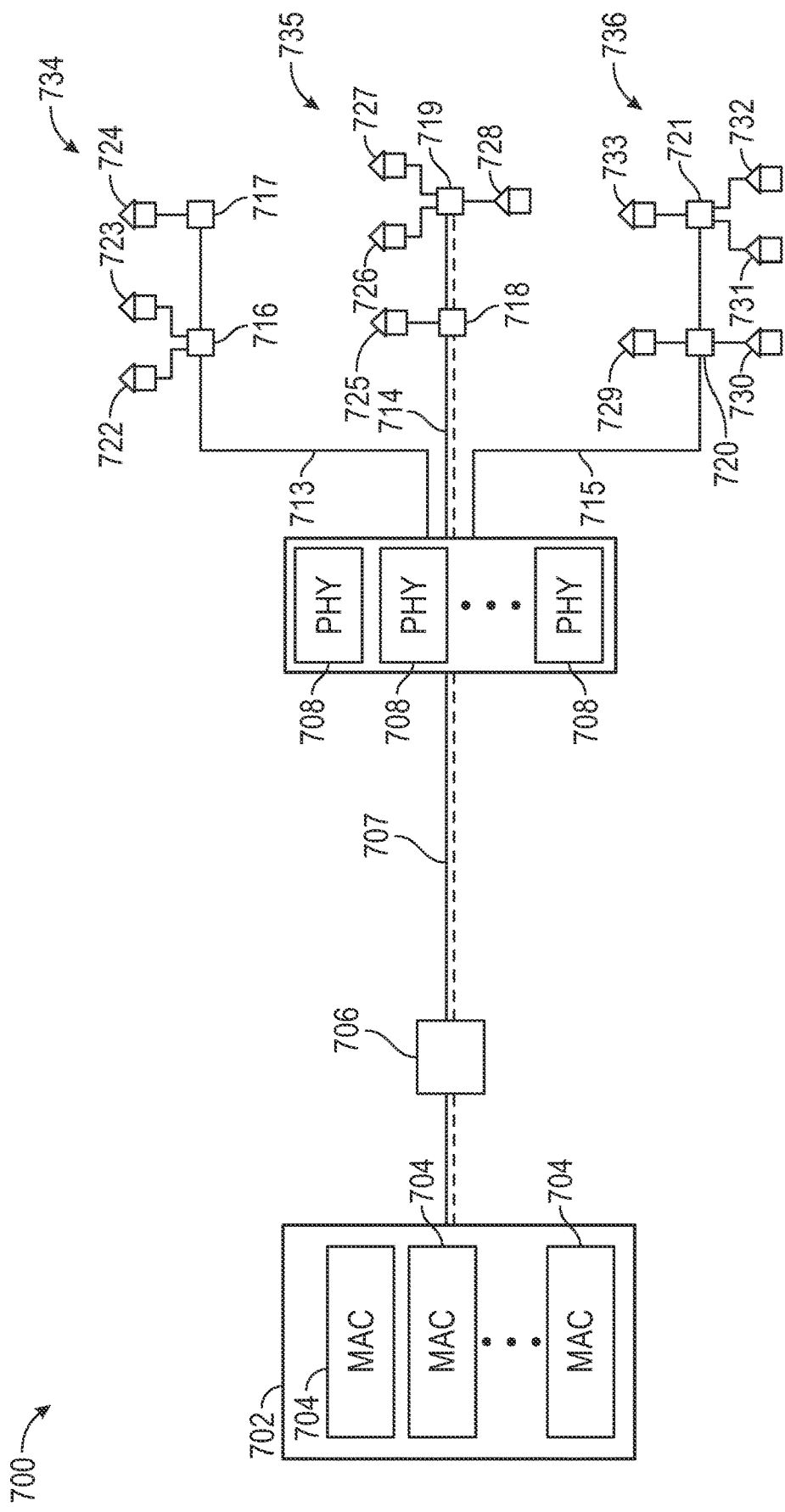
FIG. 7 depicts an example system architecture, in accordance with one or more example embodiments of the disclosure.

FIG. 7 depicts an example network 700 architecture, in accordance with one or more example embodiments of the disclosure. In particular, the network 700 depicted in FIG. 7 may include may include a one or more MAC controllers 704. The one or more MAC controllers may be located within a headend 702, for example, but may similarly be located in any other part of the network 700 (for example, outside of the headend as remote MAC controllers). The network 700 may separate out the functionality of a cable modem termination system (CMTS) into a MAC layer device (for example, the MAC controller 704) and a PHY layer device 708, as may be described in further detail below (however, again, the network 700 may also be configured in other ways, such as both the one or more MAC controllers 704 and the one or more PHY devices 708 being included within or outside of the headend 702). Networks, such as network 700, making use of remote PHY devices 708 may use at least two different methods of transmitting data packets. In a first method depicted in network 700, a hardware-based MAC layer device 704 (the terms "MAC layer device" and "MAC controller" may be used interchangeably herein) may receive incoming data packets and may transmit the data packets to a remote PHY device 708 over fiber 707 (for example, digital fiber). In some embodiment, the data packets may be transmitted to another device (for example, a customer premise equipment) using the remote PHY device 708. In particular, the data packets can be transmitted from the remote PHY device 708 on coaxial fiber (for example coaxial fiber on leg 713, leg 714, and/or leg 715 of the PHY device 708) to a customer (for example, to a customer's premise equipment (CPE), such as a cable modem). Additionally, one or more amplifiers (not shown in the figure) may be used to prevent the attenuation of the signal.

As noted, in some embodiments, networks making use of remote PHY devices 704 may use at least two different methods of transmitting data packets, the first method of which was described above. A second method to transmit data packets on the network may involve performing aspects of the above transmission in software (for example, in a cloud computing environment). In such a case, the MAC layer 702 functionality may be software-implemented (for example, in the cloud), and such functionality may be referred to as a virtual MAC (VMAC) layer 702. Accordingly, as packets are received (for example, from another device such as a headend) and processed by the VMAC 702, the data packets may then be transmitted out (for example, using Ethernet switches, hubs, routers, and the like) to the remote PHY device 708 over fiber 707 (for example, digital fiber). From the remote PHY device 708 the data packets may be transmitted over coaxial cables (for example coaxial fiber on leg 713, leg 714, and leg 715 of the PHY device 708) to a customer using one or more amplifiers (not shown in the figure) to reduce the attenuation of the signal. For example, the data packets may be transmitted to a customer's premise equipment (CPE) (for example, CPE 722, CPE 723, and CPE 724, CPE 725, CPE 726, CPE 727, and CPE 728, CPE 729, CPE 730, CPE 731, CPE 732, and/or CPE 733, as well as any other number of CPEs), such as a cable modem. It should be noted that although reference is made herein to certain portion of the network using fiber cables and certain portions using coaxial cables, these same portions may also include any other type of transmission cable as well.

In some embodiments, a cable modem termination system (CMTS) may include devices that represent layer-1, layer-2, and/or any other layer functionality of the Open Systems Interconnection (OSI) model used in connection with cable networks. In some embodiments, devices that represent the layer-1, layer-2, and/or any other layer functionality may have a system architecture wherein all the devices are placed in one chassis, that is, in one chassis in one geographical location. In another embodiment, in a remote PHY topology (for example, the topology shown and described in connection with FIGS. 1-2), the layer-1 and/or layer-2 devices can exist in a different chassis that may be distributed throughout the network 700. In some embodiments, the various layer-1 and/or layer 2 devices in the distributed architecture described herein can communicate with one another using an Ethernet-based protocol. In another embodiment, the various devices (that is the layer-1 and/or layer-2 devices) can communicate using a downstream external PHY interface (DEPI) protocol, for example, between a layer-2 device to a layer-1 device. In another embodiment, the DEPI protocol can be used between devices that both have MAC functionality. In some embodiments, the various devices can use an upstream external PHY interface (UEPI) protocol to communicate between devices of different layer types, for example, between devices having MAC functionality.

In some embodiments, the different layer devices (for example layer-1 and/or layer-2 devices) can communicate using a tunneling protocol and/or method, such as, a layer-2 virtual private network (VPN) tunnel, a generic router encapsulation (GRE) and/or a pseudowire. In some embodiments, the pseudowire can refer to an emulation of a point-to-point connection over a network. In some embodiments, the pseudowire can be used to transport frames (for example, DOCSIS frames), over a cable network. In some embodiments, the pseudowire can use a layer two tunneling protocol (L2TP) underlying protocol. In another embodiment, the pseudowire and/or tunnel can use an internet telephony (IP) protocol, such as IPv6 and/or IPv4.

In some embodiments, the DEPI protocol, the UEPI protocol, and/or a generic control plane (GCP) protocol can control aspects of the delivery of Data Over Cable Service Interface Specification (DOCSIS) frames between devices. In some embodiments, DEPI can represent a pseudowire that can connect frames (such as DOCSIS downstream MAC frames) from device from one layer (such as a layer-2 device), to a device from a different layer (for example, a layer-1 device). In some embodiments the devices from the different layers can be provided in separate locations. In some embodiments, the different layer devices can be connected using a common timing source. In some embodiments, the DEPI protocol, the UEPI protocol, and/or the GCP protocol used by the different layer devices (for example layer-1 and/or layer-2 devices) can be used to set up a session and tear down a session between the different layer devices.

In some embodiments, as used herein, the physical (PHY) layer may represent a fundamental layer in the OSI stack underlying the logical data structures of higher level functions (for example, the MAC layer) in a network. For example, the PHY layer may refer to layer-1 of the OSI stack. A PHY layer device may only include layer-1 functionality, or may also include a combination of any number of functionalities of any of the layers of the OSI stack. The physical layer can define the means of transmitting raw bits rather than logical data packets over a physical link connecting network nodes. The bit stream may be grouped into code words or symbols and may be converted to a physical signal that is transmitted over a hardware transmission medium (e.g., coaxial cable). The physical layer may provide an electrical and procedural interface to the transmission medium. The physical layer may include the shapes and properties of the electrical connectors, the frequencies to broadcast on, the modulation scheme to use and the like. In some instances, any of the PHY devices herein may only include PHY functionality and may not include any other OSI stack functionality. However, in some embodiments, the PHY devices may include other layer functionality of the OSI stack as well, such as MAC layer functionality, or any other functionality.

In some embodiments, the MAC layer may represent a fundamental layer in the OSI stack that may provide addressing and/or channel access control mechanisms that can allow several terminals or network nodes to communicate within a multiple access network that incorporates a shared medium, for example an Ethernet, cable, telecommunications, wireless, or other type of network. For example, the MAC layer may refer to layer-2 of the OSI stack. A MAC layer device may only include layer-2 functionality, or may also include a combination of any number of functionalities of any of the layers of the OSI stack. In some embodiments, the MAC layer can act as an interface and/or intermediary layer between the application layer and the network's physical layer. In some embodiments, the MAC layer can emulate a full-duplex logical communication channel in a multi-point network. Multipoint networks can include, but not be limited to, wireless Internet and IP telephony networks, for example, using gigahertz radio frequencies. This channel may provide unicast, multicast or broadcast communication service. Further some functions performed by the MAC layer can include frame delimiting and recognition, addressing of destination network nodes (both as individual nodes and as groups of nodes), conveying of addressing information, protecting against errors, for example by generating and/or checking frame check sequences, and controlling access to the physical transmission medium. The MAC layer can be implemented by numerous devices, including, but not limited to, a cable modem termination system (CMTS), an optical line termination (OLT), or a wireless access point (WAP), and the like. In various embodiments, layer-2 devices (for example the MAC layer devices) can perform mapping operations. For example, the layer-2 devices (for example the MAC layer devices) can associate a service flow identifier to a data group and/or a service group, for example, as a part of a bonding group. In some implementations, the functionality of layer-2 described above may be performed by one or more management computing entity 600 as shown in FIG. 6.

In some examples, the functionality of one or more layers (for example, layer-1 and layer 2, as well as any other layers) may be combined. In some embodiments described herein the functionality of the layer-1 and the functionality of layer-2 may be performed by separate devices, (for example, split MAC/PHY devices). In another embodiment described herein the functionality of the layer-1 and the functionality of layer-2 may be incorporated into separate devices, to create a fully distributable set of devices. Further, layer-2 functionality (for example a CMTS and/or an OLT functionality for wireless access point (WAP) functionality) can be provided by a separated module/device. Moreover, layer-1 (the PHY layer) can be provided by a separated module/device.

In some embodiments, the various devices incorporating different layer functionality can be separated geographically. For example, a layer-2 device may be placed at a predetermined distance away from a layer-1 device. In some examples, the distance may be 1 mile, 10 miles, 100 miles and/or the like. The layer-2 device can communicate (for example serialize and/or send data frames and/or packets) with the layer-1 device. For example, the layer-2 device can use one or more lookup tables, the lookup tables having information including, but not limited to, topology information, bridging information, and/or layer-2 device (for example MAC 2, Cable Modem 2, and/or wireless device) information (for example identification information, bandwidth capability information, location information, and the like). In some embodiments, the layer-2 device can perform global service flow classification and/or basic service flow. The layer-2 device may have source address verification (SAV) policing. In various embodiments, the layer-1 device can perform one or more of the classification routines that can be performed in the MAC layer.

It should be noted that although the description above may refer only to layer-1 and/or layer-2 devices this may only be for exemplification purposes, and any other devices including functionality of any combination of layers in the OSI stack may similarly be applicable.

In some embodiments, a network scheduler may be configured to over in connection with the various devices of the remote MAC-based network. For example, the network scheduler may perform scheduling of the data packets at various devices (e.g., at the headend and/or hub devices, the remote MAC devices, and the like) at the outside plant side. Further, the multiple remote PHY devices may receive data packets from a given remote MAC device based on a schedule determined by the network scheduler. For example, a network scheduler may feed multiple (e.g., twenty-four) remote PHY devices out of a single remote MAC device having dedicated MAC computer chip(s) employing MAC functionality. Moreover, because remote MAC devices may have dedicated computer chips with relatively high processing power, a given remote MAC device in combination with associated remote PHY devices may be able to provide data to a relatively large number of customers (e.g., approximately twenty thousand customers).

In various aspects, the MAC device 702 and/or the remote PHY device 704 may include aspects of the functionality of the management computing entity 500, as shown and described in connection with FIG. 5. In particular, the MAC device 702 and/or the remote PHY device 704 may include or be in communication with one or more processing elements 701, memory 710, volatile memory 711, and may include a communication interface 720 (for example, to communicate with between each other and with various customer premise equipment such as cable modems).

Moreover, the customer premise equipment 720 may include devices that include aspects of the functionality of the user device 610, as further shown and described in connection with FIG. 6. For example, customer premise equipment 720 may include a transmitter 708, a receiver 704, and/or a network interface (for example, to communicate with an access point or other device to receive information from the remote PHY device 704 or similar device). Moreover, the customer premise equipment may include volatile memory 722 and/or non-volatile memory 724 in addition to a processor (for example, to perform one or more computational tasks, such as processing received signals, etc.). Further, the customer premise equipment may include a display 716 and/or a keypad 718 (for example, for interacting with a user or operator). Again, it should be noted that the network 700 configuration depicted in FIG. 7 may only be one example of a network configuration that may be used, and any other configuration may similarly be applicable to the PD-NOMA usage described herein. That is, the PD-NOMA usage described herein may similarly be applied to transmissions between any two or more devices in any network configuration.

That which is claimed is:
1. A system comprising:
a first group of customer devices in a Data Over Cable Service Interface Specification (DOCSIS) network configured to transmit first blocks of data within a first time slot and at a first power level, the first power level being based on an attenuation of a first network tap device upstream from and in communication with the first group of customer devices;
a second group of customer devices in the DOCSIS network configured to transmit second blocks of data within the first time slot and at a second power level, the second power level being based on an attenuation of a second network tap device upstream from and in communication with the second group of customer devices, and the second network tap device configured to receive an output from the first network tap device, the first power level being different than the second power level; and
a third group of customer devices in the DOCSIS network configured to transmit third blocks of data within a second time slot and at the first power level, the third group of customer devices downstream from and in communication with a third network tap device having a same attenuation as the first network tap device,
wherein the first group of customer devices and the third group of customer devices are virtually grouped together based on use of the first power level, and the virtual grouping excluding the second group of customer devices.
2. The system of claim 1, wherein a device in the DOCSIS network is configured to:

receive at least one of the first blocks of data and at least one of the second blocks of data simultaneously; and separate the first blocks of data from the second blocks of data using at least one of: successive interference cancellation (SIC) or parallel interference cancellation (PIC).

3. The system of claim 1, wherein the first group of customer devices are further configured to transmit the first blocks of data at a first frequency within the first time slot, and the second group of customer devices are further configured to transmit the second blocks of data at the first frequency within the first time slot.

4. The system of claim 1, wherein the first group of customer devices further comprise one or more Bit Error Rate (BER) modules, one or more QAM de-mapping modules, one or more zero forcing modules, one or more Fast Fourier Transform (FFT) modules and one or more cyclic prefix removal modules.

5. The system of claim 1, wherein the first group of customer devices further comprise one or more parallel/serial conversion modules, one or more QAM mapping modules, one or more signal to noise ratio control modules, one or more Inverse Fast Fourier Transform (IFFT) modules and one or more cyclic prefix adding modules.

6. The system of claim 1, wherein the first blocks of data and second blocks of data are transmitted using Power Domain Non-Orthogonal Multiple Access (PD-NOMA).

7. The system of claim 1, further comprising a device in the DOCSIS network configured to transmit a block of data at the first power level and in the second time slot.

8. A method, comprising:
transmitting, via a first group of customer devices in a Data Over Cable Service Interface Specification (DOCSIS) network, first blocks of data within a first time slot and at a first power level, the first power level being based on an attenuation of a first network tap device upstream from and in communication with the first group of customer devices;
transmitting, via a second group of customer devices in the DOCSIS network, second blocks of data within the first time slot and at a second power level, the second power level being based on an attenuation of a second network tap device upstream from and in communication with the second group of customer devices, and the second network tap device configured to receive an output from the first network tap device; and
transmitting, via a third group of customer devices in the DOCSIS network, third blocks of data within a second time slot and at the first power level, the third group of customer devices downstream from and in communication with a third network tap device having a same attenuation as the first network tap device,
wherein the first group of customer devices and the third group of customer devices are virtually grouped together based on use of the first power level, and the virtual grouping excluding the second group of customer devices.

9. The method of claim 8, further comprising:
receiving, by a device in the DOCSIS network, the first blocks of data and the second blocks of data; and
separating, by the device, the first blocks of data from the second blocks of data using at least one of: successive interference cancellation (SIC) or parallel interference cancellation (PIC).

10. The method of claim 8, wherein transmitting the first blocks of data within a first time slot further comprises transmitting the first blocks of data at a first frequency, and wherein transmitting the second blocks of data further comprises transmitting the second blocks of data at the first frequency.

11. The method of claim 8, wherein the first group of customer devices further comprise one or more Bit Error Rate (BER) modules, one or more QAM de-mapping modules, one or more zero forcing modules, one or more Fast Fourier Transform (FFT) modules and one or more cyclic prefix removal modules.

12. The method of claim 8, wherein the first group of customer devices further comprise one or more parallel/serial conversion modules, one or more QAM mapping modules, one or more signal to noise ratio control modules, one or more Inverse Fast Fourier Transform (IFFT) modules and one or more cyclic prefix adding modules.

13. The method of claim 8, wherein the first blocks of data and second blocks of data are transmitted using Power Domain Non-Orthogonal Multiple Access (PD-NOMA).

14. The method of claim 8, further comprising:
transmitting, by a device in the DOCSIS network, a block of data at the first power level and in the second time slot.

15. A non-transitory computer-readable medium storing computer-executable instructions, that when executed by at least one processor, cause the at least one processor to perform operations of:
transmitting, via a first group of customer devices in a Data Over Cable Service Interface Specification (DOCSIS) network, first blocks of data within a first time slot and at a first power level, the first power level being based on an attenuation of a first network tap device upstream from and in communication with the first group of customer devices;
transmitting, via a second group of customer devices in the DOCSIS network, second blocks of data within the first time slot and at a second power level, the second power level being based on an attenuation of a second network tap device upstream from and in communication with the second group of customer devices, and the second network tap device configured to receive an output from the first network tap device; and
transmitting, via a third group of customer devices in the DOCSIS network, third blocks of data within a second time slot and at the first power level, the third group of customer devices downstream from and in communication with a third network tap device having a same attenuation as the first network tap device,
wherein the first group of customer devices and the third group of customer devices are virtually grouped together based on use of the first power level, and the virtual grouping excluding the second group of customer devices.

16. The non-transitory computer-readable medium of claim 15, wherein the computer-executable instructions further cause the at least one processor to perform operations of:
receiving, by a third device in the DOCSIS network, the first blocks of data and the second blocks of data; and
separating, by the third device, the first blocks of data from the second blocks of data using at least one of: successive interference cancellation (SIC) or parallel interference cancellation (PIC).

17. The non-transitory computer-readable medium of claim 15, wherein transmitting the first blocks of data within a first time slot further comprises transmitting the first blocks of data at a first frequency, and wherein transmitting the second blocks of data further comprises transmitting the second blocks of data at the first frequency.

18. The non-transitory computer-readable medium of claim 15, wherein the first group of customer devices further comprise one or more Bit Error Rate (BER) modules, one or more QAM de-mapping modules, one or more zero forcing modules, one or more Fast Fourier Transform (FFT) modules and one or more cyclic prefix removal modules.

19. The non-transitory computer-readable medium of claim 15, wherein the first group of customer devices further comprises one or more parallel/serial conversion modules, one or more QAM mapping modules, one or more signal to noise ratio control modules, one or more Inverse Fast Fourier Transform (IFFT) modules and one or more cyclic prefix adding modules.

20. The non-transitory computer-readable medium of claim 15, wherein the first blocks of data and second blocks of data are transmitted using Power Domain Non-Orthogonal Multiple Access (PD-NOMA).

\* \* \* \* \*